US008082460B2

(12) United States Patent
Oya et al.

(10) Patent No.: US 8,082,460 B2
(45) Date of Patent: Dec. 20, 2011

(54) NETWORK-CONNECTABLE DEVICE AND METHOD FOR MANAGING POWER OF THE NETWORK CONNECTABLE DEVICE USING A PLURALITY OF POWER MODES

(75) Inventors: Makoto Oya, Aichi (JP); Satoru Goto, Aichi (JP)

(73) Assignee: Buffalo Inc., Nagoya-shi (JP)

( * ) Notice: Subject to any disclaimer, the term of this patent is extended or adjusted under 35 U.S.C. 154(b) by 468 days.

(21) Appl. No.: 12/265,284

(22) Filed: Nov. 5, 2008

(65) Prior Publication Data

US 2009/0125732 A1    May 14, 2009

(30) Foreign Application Priority Data

Nov. 5, 2007 (JP) .................. P2007-287171

(51) Int. Cl.
*G06F 1/32* (2006.01)
(52) U.S. Cl. ............ 713/323; 713/324; 713/320
(58) Field of Classification Search .......... 709/208–211, 709/220–226; 713/300–340
See application file for complete search history.

(56) References Cited

U.S. PATENT DOCUMENTS

| 4,809,163 | A | 2/1989 | Hirosawa et al. | |
|---|---|---|---|---|
| 6,715,088 | B1 * | 3/2004 | Togawa ................. | 713/320 |
| 7,171,524 | B2 * | 1/2007 | Kobayashi et al. ......... | 711/147 |
| 7,376,853 | B2 * | 5/2008 | Akiba ..................... | 713/324 |
| 7,409,569 | B2 * | 8/2008 | Illowsky et al. ............ | 713/323 |
| 7,596,686 | B2 * | 9/2009 | Dubinsky .................. | 713/2 |
| 7,814,351 | B2 * | 10/2010 | Lubbers et al. ............ | 713/300 |
| 7,849,129 | B2 * | 12/2010 | Shitomi .................. | 709/202 |
| 7,873,867 | B2 * | 1/2011 | Ikawa et al. ............. | 713/300 |
| 2005/0210191 | A1 * | 9/2005 | Kobayashi et al. ......... | 711/114 |
| 2007/0073918 | A1 * | 3/2007 | Ohnishi .................. | 710/14 |
| 2007/0079063 | A1 * | 4/2007 | Mizuno .................. | 711/112 |
| 2008/0244295 | A1 * | 10/2008 | Mizuno .................. | 713/324 |

FOREIGN PATENT DOCUMENTS

| JP | 59-212930 | 12/1984 |
|---|---|---|
| JP | 2-173816 | 7/1990 |
| JP | 5-165552 | 7/1993 |
| JP | 2001-209464 | 8/2001 |
| JP | 2004-151824 | 5/2004 |
| JP | 2004-199477 | 7/2004 |

OTHER PUBLICATIONS

U.S. Appl. No. 12/265,275, filed Nov. 5, 2008, Oya, et al.
U.S. Appl. No. 12/130,576, filed May 30, 2008, Makoto Oya.

* cited by examiner

*Primary Examiner* — Raymond Phan
(74) *Attorney, Agent, or Firm* — Oblon, Spivak, McClelland, Maier & Neustadt, L.L.P.

(57) ABSTRACT

A network-connectable device is configured to communicate with one or more computer-related devices via a network. The network-connectable device includes: a mode selector configured to select a power mode between a first power mode and a second power mode; a power state switching unit operable on the first power mode and configured to: turn on power of the network-connectable device when one of the computer-related devices is connected to the network in a state where no computer-related device has been connected to the network; and shut down the power no computer-related device is connected to the network; and a power state maintaining unit operable on the second power mode and configured to maintain the power of the network connectable device in a same state regardless of whether the computer-related devices are connected to or disconnected from the network.

10 Claims, 10 Drawing Sheets

NETWORK-CONNECTABLE DEVICE AND METHOD FOR MANAGING POWER OF THE NETWORK CONNECTABLE DEVICE USING A PLURALITY OF POWER MODES

CROSS-REFERENCE TO RELATED APPLICATIONS

This application is based on and claims the priority from Japanese Patent Application No. 2007-287171 filed on Nov. 5, 2007, the entire contents of which are incorporated herein by reference.

TECHNICAL FIELD

The present invention relates to, in an environment where one or more computer-related devices are configured to communicate with a common device via wired or wireless network, an improvement in a technique for managing power of the device.

BACKGROUND

There is an environment where a plurality of computer-related devices can communicate with a common device via a wired or wireless network. In the specification, the "computer-related device" includes all types of electrical appliances that implement given functions by use of a computer. Specifically, the computer-related device includes digital home electrical appliances such as personal computers and television sets but is not limited thereto.

An example of a device used in this kind of communication environment includes NAS (network-attached storage). JP-A-2004-151824 describes an example of technique constituting the network including such an NAS. The entirety of the publication is incorporated herein by reference.

Generally, the NAS includes a data-recordable hard disk and a motor for driving the hard disk. The motor is driven by electric power supplied from a power source.

In general, there is a need for a power saved and/or silenced device by reducing wasteful operations of the device, regardless of the environment in which the device is used. The environment includes: an environment in which a plurality of computer-related devices communicate with the device (a common device) via a wired or wireless network (hereinafter referred to as a "network-connected environment") or an environment where each of the computer-related devices individually and directly connected to corresponding one of the devices (hereinafter referred to as an "individually-connected environment").

For example, when the device is the NAS including a cooling fan for cooling the motor, reduction of wasteful operations leads to not only a reduction in power consumption but also silencing due to the reduction of wasteful operations of the cooling fan.

When the device is used in the individually-connected environment, power of the device can be appropriately management by monitoring the state (an operative state or an inoperative state) of the corresponding computer-related device and controlling the power state of the device in response to the monitored results.

However, when the device is used in the network-connected environment, the device is shared by a plurality of computer-related device. Therefore, the appropriate power management of the device used in the network-connected environment is hardly realized by only a technique employed in the individually-connected environment.

SUMMARY

The inventors have proposed a technique for appropriately managing the power of the device when the device is used in the network-connected environment. In the technique, a main power of a shared device shared among a plurality of computer-related devices is activated in response to power-on operation of first one of the plurality of computer-related devices and is shut off in response the disconnection from the network of all the computer-related devices.

However, the inventors have found that the user is not always satisfied by means of shutting down the main power of the shared device in response to the disconnection from the network of all the computer-related devices sharing the shared device.

For example, in a situation where a single device is shared among a plurality of computer-related devices and where the shared device can monitor changes in the operating status of each of the computer-related devices, the shared device may be connected to another certain product (e.g., a home digital electrical appliance) impossible to monitor a change in an operating state of the product.

In this case, the product may be connected to the shared device via the same network as the computer-related device connects or may be connected to the shared device without involvement of the network.

In any event, in case where the unmonitorable product requires use of the shared device irrespective of other computer-related devices, the unmonitorable product cannot use the shared device later if the shared device is shut down in response to the disconnection of all the computer-related devices.

As mentioned above, when a plurality of products sharing the single device include products whose changes in operating state can be monitored by the shared device (i.e., the computer-related device) and products whose changes in operating state cannot be monitored by the shared device, the power management of the shared device in response to the changes in statuses of the devices that can be monitored may not be desirable for the user.

The present invention was made in consideration of the above circumstances and an object thereof is to provide an improved technique of power management of a network-connectable device that is common to and capable of communicating with a plurality of computer-related devices via a wired or wireless network.

According to an aspect, the present invention provides a network-connectable device configured to communicate with one or more computer-related devices via a network, said network-connectable device comprising: a mode selector configured to select a power mode between a first power mode and a second power mode; a power state switching unit operable on the first power mode and configured to: turn on power of the network-connectable device when one of the computer-related devices is connected to the network in a state where no computer-related device has been connected to the network; and shut down the power when no computer-related device is connected to the network; and a power state maintaining unit operable on the second power mode and configured to maintain the power of the network connectable device in a same state regardless of whether the computer-related devices are connected to or disconnected from the network.

According to another aspect, the invention provides a method for managing power of a network-connectable device from a computer-related device connected thereto via a network, the network-connectable device comprising: a mode selector configured to select a power mode between a first power mode and a second power mode; a power state switching unit operable on the first power mode and configured to: shut down the power of the network-connectable device when the network-connectable device receives a stop command signal; and turn on the power of the network-connectable device when the network-connectable device receives a start command signal; and a power state maintaining unit operable on the second power mode and configured to maintain the power of the network connectable device in a same state regardless of whether the computer-related devices are connected with or disconnected from the network-connectable device, said method comprising: determining, in response to a disconnection operation of computer-related device for a disconnection from the network, whether other computer-related devices are already shut down; transmitting the stop command signal to the network-connectable device via the network when all the other computer-related devices are already shut down as a result of the determination; and transmitting the start command signal to the network-connectable device via the network in response to connection operation of the computer-related device for a connection with network.

According to still another aspect, the present invention provides a power management method for a network-connectable device that is configured to communicate with one or more computer-related devices via a network and comprises a mode selector configured to select a power mode between a first power mode and a second power mode, said method comprising: during the first power mode, turning on power of the network-connectable device based on a status change from a state where no computer-related device is connected with the network to a state where one of the computer-related devices is connected to the network; during the first power mode, shut down the power based on a status change from a state where at least one of the computer-related devices is connected with the network to a state where no computer-related device is connected with the network; and during the second power mode, maintain the power of the network connectable device in a same state regardless of whether the computer-related devices are connected with or disconnected from the network-connectable device.

DESCRIPTION

Figure 1:
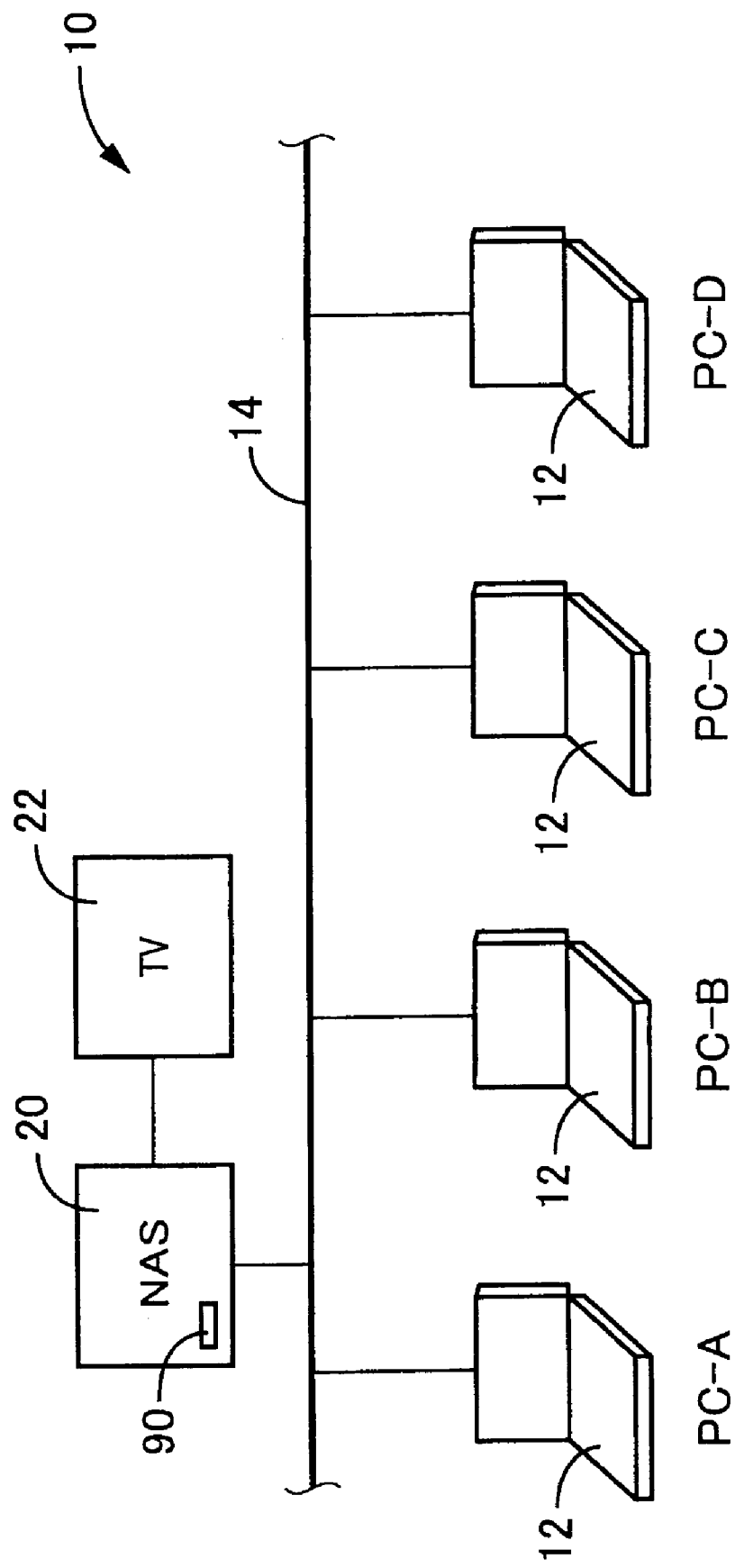
FIG. 1 is a schematic diagram showing a network system using a NAS (Network-Attached Storage) as a network-connectable device complying with a first embodiment of the present invention.

The following aspects of the invention are provided. Each of the aspects is divided into sections, and the sections are assigned numerals. The aspects are described by citing numerals assigned to other sections. This is intended for making it easy to comprehend portions of technical features and combinations thereof that can be adopted by the aspects of the present invention. It should not be construed that technical features and their combinations, which can be adopted by the present invention, be limited to the following aspects. Specifically, it should be interpreted that, though not described in the following aspects, extracting and adopting technical features described in this application as technical features of the present invention is not impeded.

Moreover, describing sections by citing numerals assigned to other sections does not always mean hindrance of separation and independence of technical features provided in respective sections from technical features provided in other sections. It should be construed that the technical features provided in the respective sections can be made independent, as required, according to the features.

(1) A network-connectable device configured to communicate with one or more computer-related devices via a network, said network-connectable device comprising: a mode selector configured to select a power mode between a first power mode (power sync mode) and a second power mode (non-power sync mode); a power state switching unit operable on the first power mode and configured to: turn on power of the network-connectable device when one of the computer-related devices is connected to the network in a state where no computer-related device has been connected to the network; and shut down the power no computer-related device is connected to the network; and a power state maintaining unit operable on the second power mode and configured to maintain the power of the network connectable device in a same state regardless of whether the computer-related devices are connected to or disconnected from the network. The power state switching unit may be configured to: turn on the power in synchronism with powered-on operation of the one of the computer-related device; and shut off the power in synchronism with shutdown operations of all of the computer-related devices.

The network-connectable device switches between the power sync mode and the non-power-sync mode in accordance with a command from the user. When the power sync mode is selected, main power of the network-connectable device is turned on in synchronism with power-on operation of the first computer-related device and shut down in synchronism with shutdown operation of all of the computer-related devices. In contrast, when the non-power-sync mode is selected, the main power of the network-connectable device is held in the same state regardless of whether the respective computer-related devices perform power-on operation or shutdown operation.

Therefore, on condition that the user selects a non-power-sync mode when the network-connectable device is shared between unmonitorable products whose operating states cannot be monitored by the network-connectable device and a plurality of computer-related devices whose operating states can be monitored by the network-connectable device, the network-connectable device can keep hold the network-connectable device in an ON state and, thereby, keeping the unmonitorable products continually using the network-connectable device regardless of operating states of the respective computer-related devices.

As a consequence, user's convenience is enhanced by the network-connectable device when the network-connectable device is shared between unmonitorable products whose operating states cannot be monitored by the network-connectable device and a plurality of computer-related devices whose operating states can be monitored by the network-connectable device.

In the present patent application, unless otherwise specified, a term "computer-related device" can be construed to mean; for instance, a desktop computer (e.g., a personal computer), a portable computer (e.g., a server, a client computer, a PDA, or a portable cellular phone), or a digital home electrical appliance having a function for establishing communication with the network-connectable device. However, the computer-related device is not limited thereto.

(2) The network-connectable device according to (1), wherein each of the computer-related devices comprises: a stop command signal transmission unit configured to: determine, in response to disconnection operation of network-connectable device for a disconnection from the network, whether other computer-related devices are already disconnected from the network; and transmit a stop command signal to the network-connectable device via the network when all the other computer-related devices are determined to be already disconnected from the network; and a start command signal transmission unit configured to transmit a start command signal to the network-connectable device via the network in response to connection operation of the network-connectable device for a connection with the network, and wherein the power state switching unit is configured to: shut down the power of the network-connectable device when the network-connectable device receives the stop command signal; and turn on the power of the network-connectable device when the network-connectable device receives the start command signal.

The network-connectable device does not need to intensively monitor changes in operating states of a plurality of computer-related devices that share the network-connectable device at the time of selection of a power sync mode; and can manage its power so as to be in synchronism with changes in operating states of the respective computer-related devices.

In the present patent application, a term "stop command signal" can be construed to mean; for instance, a signal that commands deactivation of a movable portion of the device (e.g., a motor) by disconnecting only the main power and without disconnection of a standby power for the network-connectable device, such as a sleep mode command signal. However, the term is not limited to such signal.

In the present patent application, a term "stop command signal" can be defined as; for instance, a signal specifically designed for deactivating the network-connectable device or a signal having another function. However, the term is not limited to them.

In the present patent application, a term "start command signal" can be construed to mean a signal; for instance, a signal that commands the network-connectable device to turn on both the main power and the standby power or a signal that commands activation of only the main power while the standby power of the network-connectable device is held in an ON state, thereby starting the movable portion (e.g., a motor) of the device. However, the term is not limited to such signals.

In the present patent application, the term "start command signal" can be defined as; for instance, a signal specifically designed for activating a network-connectable device or a signal having another function (e.g., an ordinary signal to be input to an interface so as to request respective computer-related devices to make an access to the network-connectable device). However, the term is not limited thereto.

(3) The network-connectable device according to (1), wherein the power state switching unit comprises: a list management unit configured to: when the list management unit receives a start command signal instructing an activation of the network-connectable device which is transmitted from a computer-related device, register the computer-related device on a list; and when the computer-related device registered on the list is switched to or is to be switched to a disconnected state (e.g., shutdown state) disconnected from the network, delete the computer-related device from the list; a shutdown unit configured to shut down power to a part of the network-connectable device when none of the computer-related devices is registered on the list; and a power-on unit configured to turn on the power when a computer-related device is registered on the list on which no computer-related device has been registered.

The network-connectable device intensively monitors changes in operating states of a plurality of computer-related devices which share the network-connectable device at the time of selection of a power sync mode, so that the respective computer-related devices do not need to monitor changes in operating states of the other computer-related devices and that power of the network-connectable device can be managed so as to be synchronized with changes in operating states of the respective computer-related devices.

(4) The network-connectable device according to any of (1) to (3), wherein the mode selector comprises a physical switch to be operated by the user and selects either the first mode and the second mode in accordance with an operating state of the switch.

The network-connectable device of any of sections (1) through (3) causes the mode selector to execute a specific program in each of the computer-related devices, thereby enabling implementation of a selector in a manner for selecting either the power sync mode or the non-power-sync mode, in accordance with user's operation performed in response to display screens of the respective computer-related devices.

In the meantime, in the network-connectable device of the present section, either the power sync mode or the non-power-sync mode is selected in response to the state of operation of a physical switch performed by the user.

Therefore, the network-connectable device does not require to cause the respective computer-related devices to execute a specific program or to detect user's operation performed in response to the display screens of the respective computer-related devices; and can select either the power sync mode or the non-power-sync mode in accordance with a user's command.

Accordingly, the network-connectable device enables selection of either the power sync mode or the non-power-sync mode in accordance with a user's command without depending on software or hardware of the respective computer-related devices.

(5) The network-connectable device according to any of (1) to (4), further comprising a motor as a drive source. The power state switching unit may switch power to the motor.

(6) The network-connectable device according to any of (1) to (5), further comprising a storage device that comprises a data-recordable hard disk driven by the motor.

(7) The network-connectable device according to any of (1) to (6), further comprising a reproducing device configured to reproduce an image or a sound. The power state switching unit may switch power to the reproducing device.

(8) The network-connectable device according to any of (1) to (7), wherein the computer-related devices comprise at least one of a desktop computer, a portable computer and a digital home electrical appliance.

(9) A program executed by a computer of each of the computer-related devices to implement the network-connectable device according to any of (1) to (8).

(10) A program executed by a computer of the network-connectable device to implement the network-connectable device according to any of (1) to (8).

In the present patent application, a term "program" can be construed to mean a combination of commands to be executed by a computer without implementation of functions of the programs or to include files or data to be processed in accordance with respective commands as well as the combination of commands. However, the program is not limited to them.

The "program" can also be embodied so as to attain; for instance, a predetermined objective as a result of being solely executed by a computer or to attain a predetermined objective as a result of being executed by a computer along with another program. However, the program is not limited to them. The program can be composed primarily of data; however, the program is not limited to the data.

(11) A computer-readable recording medium having recorded thereon the program according to (9) or (10).

The recording medium can adopt various forms. For instance, there can be adopted any one of a magnetic recording medium such as a flexible disk; an optical recording medium such as a CD or a CD-ROM; a magneto-optical recording medium such as an MO; an unremovable storage such as ROM, and the like. However, the recording medium is not limited to them.

Illustrative embodiments of the present invention will be described in detail with reference to the drawings.

FIG. 1 is a schematic diagram showing a network system 10 using a network-connectable device according to a first embodiment of the present invention.

In the network system 10, four personal computers (hereinafter abbreviated as "PCs") 12 are connected to allow communication with one another via a wireless or wired network 14 (e.g., a LAN (Local Area Network), a WAN (Wide Area Network, the Internet, etc).

The PCs 12 are used by respective users. The respective PCs 12 are distinguished from one another by designations as "PC-A," "PC-B," "PC-C" and "PC-D."

A NAS (Network-Attached Storage) 20 is connected to the network 14. The NAS 20 is shared by four PCs 12. Therefore, the NAS 20 is accessible from any of the PCs 12.

As shown in FIG. 1, a TV set 22 is connected to the NAS 20 without involvement of the network 14. The TV set 22 is configured to reproduce video data stored on the NAS 20. The TV set 22 is also configured to transfer video data, which is created based on a video signal received in the form of a radio wave, to the NAS 20 to allow the NAS 20 to store the transferred video data. The TV set 22 is an example of a product whose operating state cannot be monitored by the NAS 20.

Figure 2:
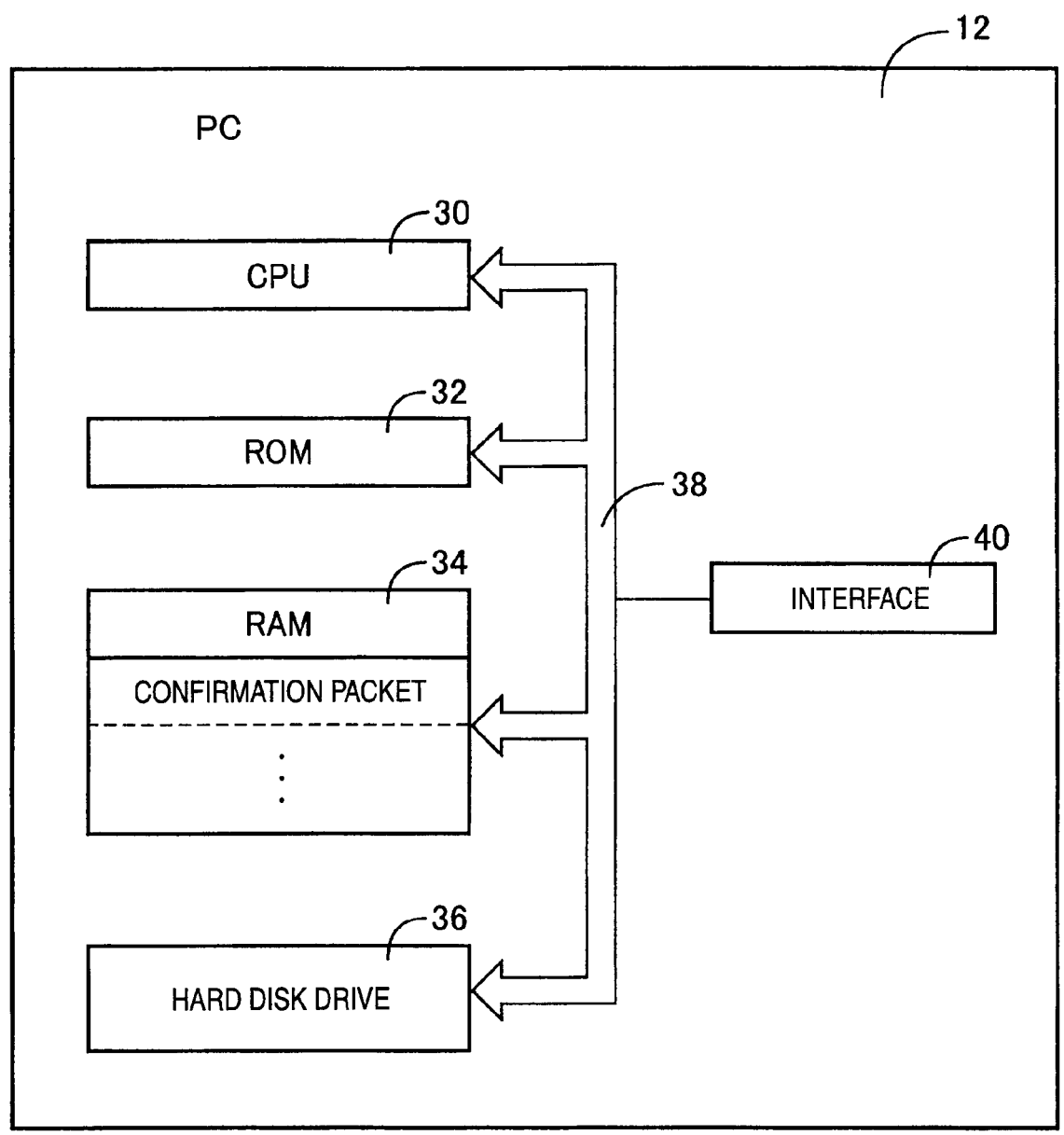
FIG. 2 is a block diagram schematically showing the hardware configuration of a typical one of four PCs (Personal Computers) shown in FIG. 1.

FIG. 2 is a schematic block diagram showing a hardware structure of a typical one of the four PCs 12. The PC 12 includes a CPU (Central Processing Unit; an example of a processor) 30, ROM (Read Only Memory; an example of nonvolatile memory serving as an example of the memory) 32, RAM (Random Access Memory; an example of volatile memory serving as another example of memory) 34 and a hard disk drive 36, which are interconnected via a bus 38.

A program for building an operation system in the PC 12 and various application programs are previously stored in the ROM 32. The hard disk drive 36 can install a program, such as a required application program, by use of an external storage medium or on-line.

The PC 12 further includes an interface 40 connected to the bus 38. The PCs 12 can be connected with the network 14, a peripheral device, and an external device via the interface 40.

Figure 3:
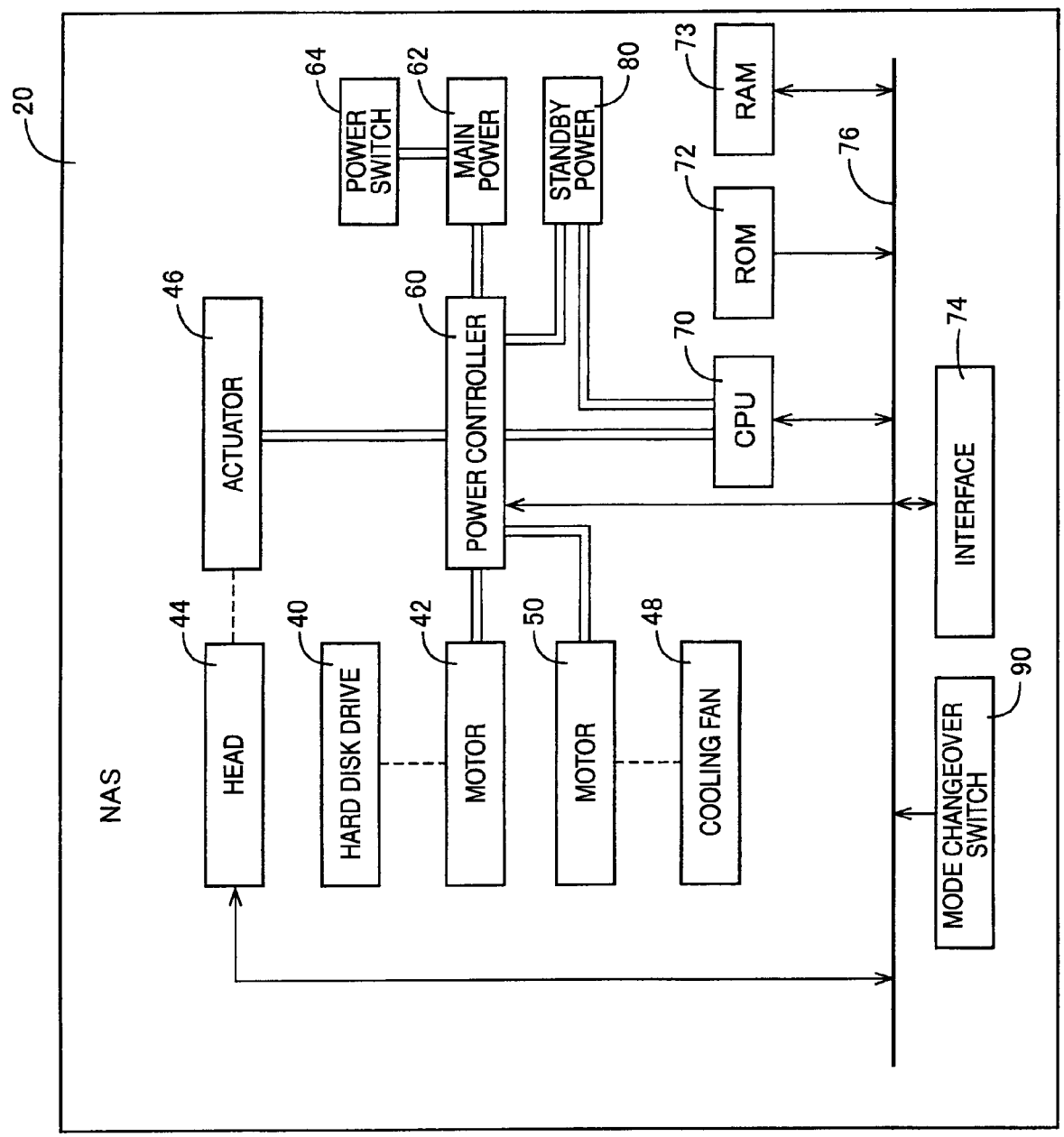
FIG. 3 is a block diagram schematically showing the hardware configuration of the NAS shown in FIG. 1.

FIG. 3 is a schematic block diagram showing the hardware structure of the NAS 20.

The NAS 20 includes: a hard disk drive 40 serving as a rotator configured to magnetically record data; and a motor 42 driven for rotating the hard disk 40.

The NAS 20 further includes a head 44 configured to read/write data from/to the hard disk drive 40 being rotated; and an actuator 46 driven for operating the head 44.

The NAS 20 further includes a cooling fan 48 configured to cool the motor 42 and a motor 50 configured to drive the cooling fan 48.

Figure 4:
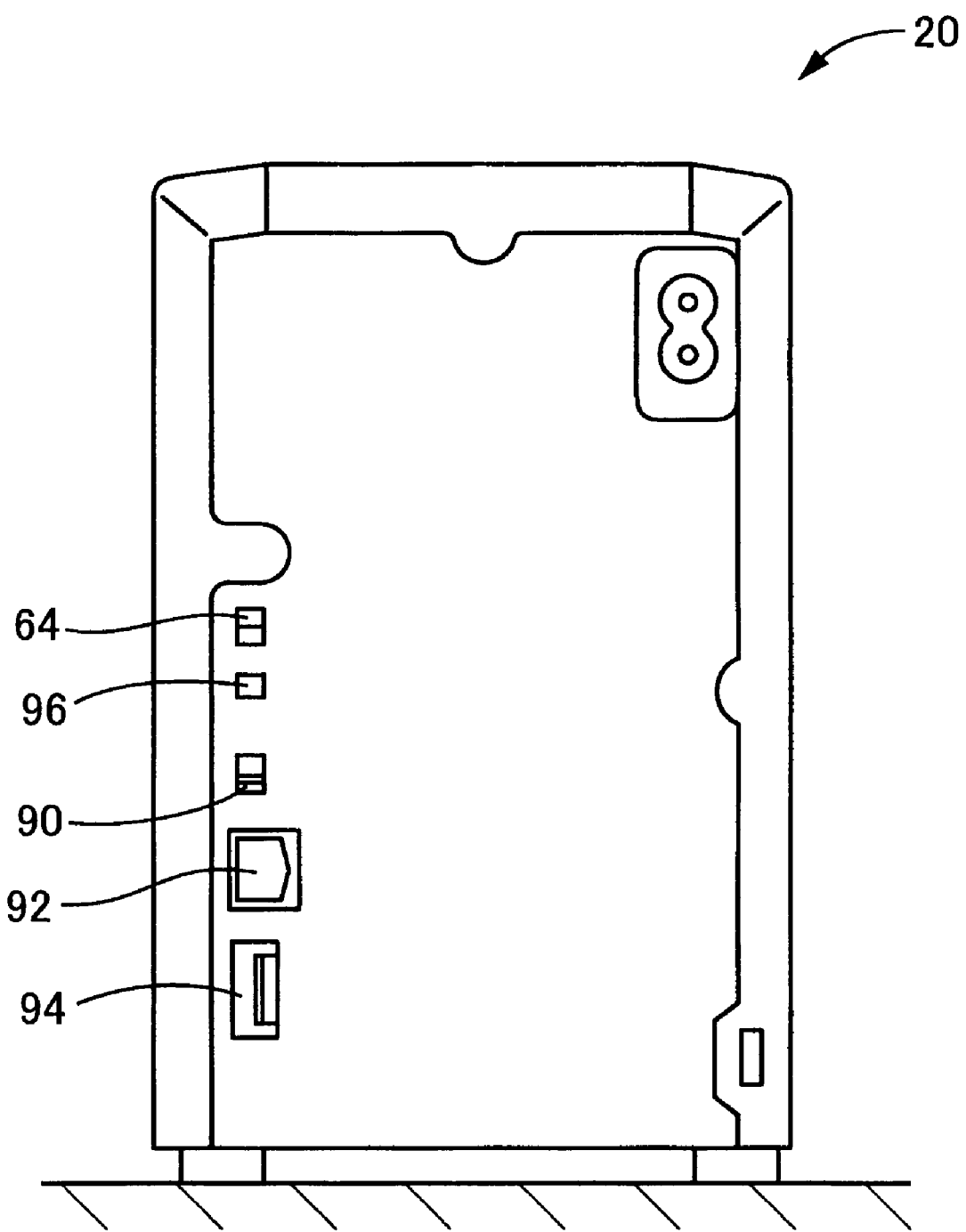
FIG. 4 is a rear view of the NAS shown in FIG. 1.

The motor 42, the actuator 46 and the motor 50 are connected to a main power 62 via a power controller 60. The motor 42, the actuator 46 and the motor 50 operate by consuming electricity supplied from the main power 62. In response to physical operation of a power switch 64 performed by the user, the main power 62 is switched between an ON state and an OFF state. FIG. 4 shows a rear view of the NAS 20 with the power switch 64 attached to the back of the NAS 20.

As shown in FIG. 3, the NAS 20 further includes: a CPU (an example processor) 70; ROM (example nonvolatile memory serving as an example of the memory) 72; RAM (example nonvolatile memory serving as another example memory) 73; and an interface 74. The CPU 70, the ROM 72, the RAM 73 and the interface 74 are interconnected via a bus 76. The bus 76 is connected to a head 44 and a power controller 60, as well.

During an ON state of the power switch 64, the power controller 60 switches the state of a connection between the motor 42, the actuator 46 and the motor 50 and the main power 62 in response to a command signal from the CPU 70, between a state (namely, an ON state) where the motor 42, the actuator 46 and the motor 50 are connected to the main power 62 and a state (namely, an OFF state) where the motor 42, the actuator 46 and the motor 50 are disconnected from the main power 62.

In order to enable the power controller 60 to perform such operations at all times, the power controller 60 and the CPU 70 are always connected to a standby power source 80. Amounts of electric power from the standby power source 80 consumed by the power controller 60 and the CPU 70 are nominal, whereas amounts of electric power from the main power 62 consumed by the motors 42 and 50 are relatively large.

In the present embodiment, when the user selects a power sync mode, transition of the NAS 20 from an operating state to a halt state (i.e., deactivation) is performed in synchronism with a shift in the states of the four PCs 12 sharing the NAS 20. In the present embodiment, the transition of NAS 20 from the operating state to the halt state corresponds to a disconnection of the motor 42, the actuator 46 and the motor 50 from the main power 62.

When transition of the NAS 20 from the operating state to the halt state is completed, the hard disk drive 40, the head 44 and the cooling fan 48 are all deactivated. Consequently, consumption of power from the main power 62 is halted, and a sound and vibrations resulting from rotation of the hard disk drive 40 and the rotation of the cooling fan 48 are also stopped.

Specifically, in the present embodiment, one of the PC 12 (hereinafter referred to as a certain PC 12) determines whether or not the other three PCs 12 are already shut down in response to shutdown operation performed by the user. When the other three PCs 12 are determined to be already shut down, the certain PC 12 transmits an end packet (described later) to the NAS 20 via the network 14.

Therefore, according to the present embodiment, when any one of the four PCs 12 sharing the single NAS 20 is in operation, there can be avoided transition of the NAS 20 to a halt state despite the PC 12 in operation, which would otherwise eventually cause a failure to make an access from the PC 12 in operation to the NAS 20.

According to the present embodiment, when all of the four PCs 12 sharing the single NAS 20 are shut down, the NAS 20 is driven from the operating state to the halt state, so that wasteful operation of the NAS 20 is omitted.

Further, in the present embodiment, when the user selects the power sync mode, transition (activation) of the NAS 20 from the halt state to the operating state is performed so as to synchronize with transition of the state of the four PCs 12 sharing the NAS 20. The transition of the NAS 20 from the halt state to the operating state corresponds to an established connection of the main power 62 to the motor 42, the actuator 46 and the motor 50.

Specifically, the certain PC 12 transmits a start packet (described later) to the NAS 20 via the network 14 in response to power-on operation of the user.

Consequently, according to the present embodiment, when any of the four PCs 12 sharing the NAS 20 is in operation, there can be avoided transition of the NAS 20 to a halt state despite the PC 12 in operation, which would eventually cause a failure to make an access from the PC 12 in operation to the NAS 20.

According to the present embodiment, when all of the four PCs 12 sharing the single NAS 20 are shut down, the NAS 20 is driven from the operating state to the halt state, so that wasteful operation of the NAS 20 is omitted.

In order to enable the foregoing operations, a PC-side program is stored on the ROM 32 or the hard disk drive 36 in each of the PCs 12, and the PC-side program is repeatedly executed by the CPU 30 in each of the PCs 12 while the PCs 12 are in operation.

Figure 5:
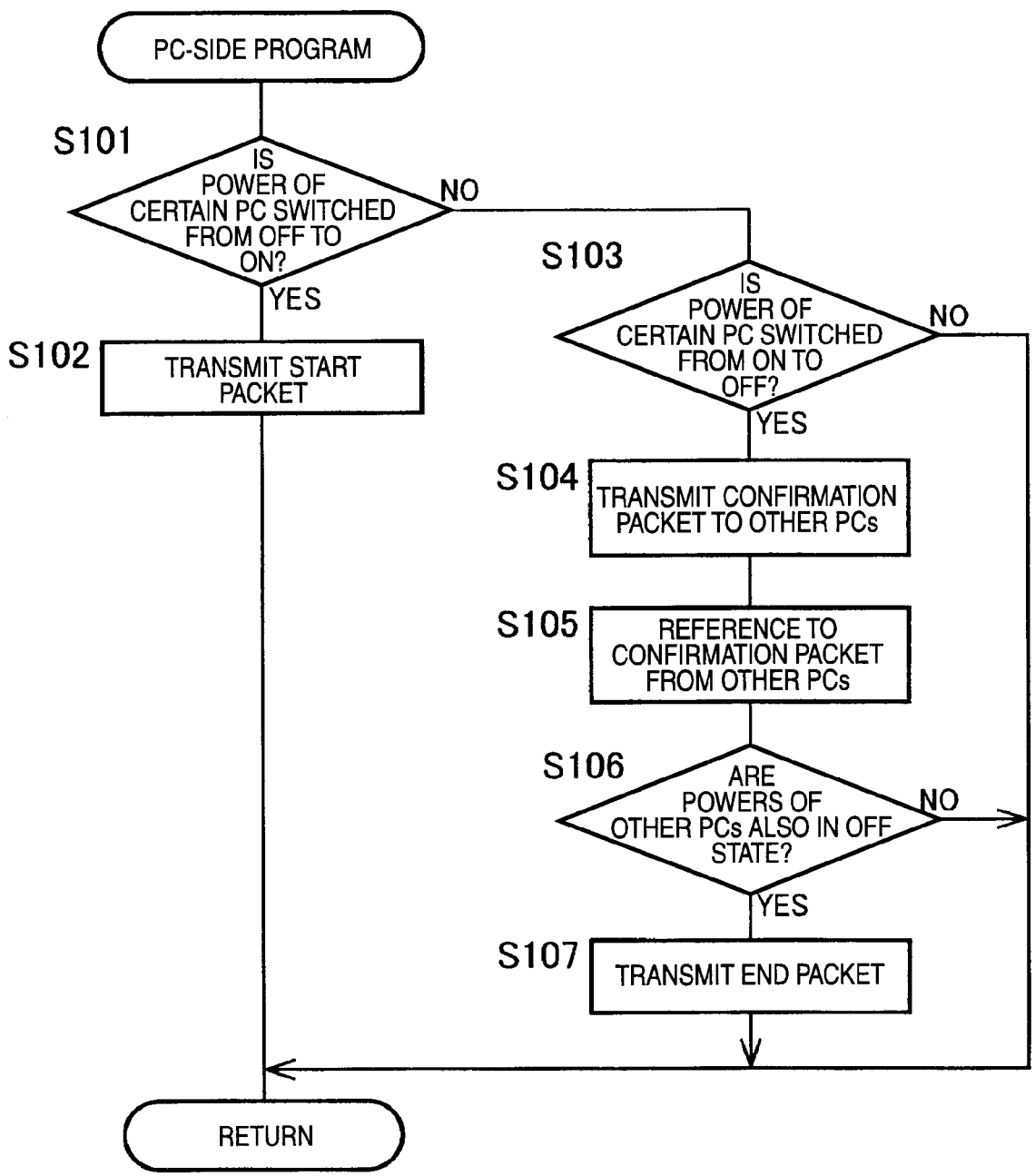
FIG. 5 is a flowchart schematically showing a PC-side program executed in each of the PCs shown in FIG. 1.

FIG. 5 is a flowchart showing operations executed by the PC-side program. When the PC-side program is executed, it is determined in step S101 whether or not the power of the certain PC 12 is switched from the OFF state to the ON state; namely, whether or not the user has performed power-on operation.

Provided that the power of the certain PC 12 is switched from the OFF state to the ON state this time, a determination made in step S101 becomes YES, and the start packet is transmitted in step S102 to the NAS 20. The start packet is an example of a signal instructing an activation of the NAS 20; namely, switching of the main power 62 of the NAS 20 from the OFF state to the ON state.

After completion of step S102, single execution of processing pertaining to the PC-side program ends.

The above explanations are provided for the case where the power of the certain PC 12 is already switched from the OFF state to the ON state. However, on the assumption that the power of the certain PC 12 is not yet switched from the OFF state to the ON state, the determination made in step S101 becomes NO, and it is determined in step S103 whether or not operation for switching the power of the certain PC 12 from the ON state to the OFF state has been performed; namely, whether or not the user has performed shutdown operation.

When operation for switching the power of the certain PC 12 from the ON state to the OFF state has been performed this time, a determination made in step S103 becomes YES, and a confirmation packet is transmitted in step S104 to the other respective PCs 12. The confirmation packet is used in the other PCs 12 for confirming the fact of the certain PC 12 being shut down by referencing the confirmation packet.

Subsequently, in step S105, confirmation packets that have already been received from the other respective PCs 12 and that are stored in the RAM 34 are referenced.

The certain PC 12 is also configured to receive the confirmation packets from the other respective PCs 12 and save the received confirmation packets in the RAM 34 during power-on, similar to the other PCs 12. The certain PC 12 also clears the received confirmation packets stored on the RAM 34 immediately before transition of the PC to power-off.

Subsequently, in step S106, on the basis of a result of reference, it is determined whether or not PC power sources (not shown) of all of the other three PCs 12 are already in the OFF state.

When the PCs power sources of all of the other three PCs 12 are already in an OFF state this time, a determination made in step S106 becomes YES, and an end packet is transmitted in step S107 to the NAS 20. The end packet is an example of a signal for instructing a deactivation of the NAS 20; namely, switching the main power 62 of the NAS 20 from the ON state to the OFF state.

After completion of execution of step S107, single execution of processing pertaining to the PC-side program ends.

In contrast, when the PC power sources of all of the other three PCs 12 are not already in the OFF state this time, the determination made in step S106 becomes NO. After skipping of processing pertaining to step S107, single execution of processing pertaining to the PC-side program ends.

The above descriptions are provided for the case where the operation for switching the power of the certain PC 12 from the ON state to the OFF state has already been performed. However, when such an operation has not yet been performed, the determination made in step S103 becomes NO, and operations in steps S104 to S107 are skipped. Thus, single execution of processing pertaining to the PC-side program ends.

Figure 6:
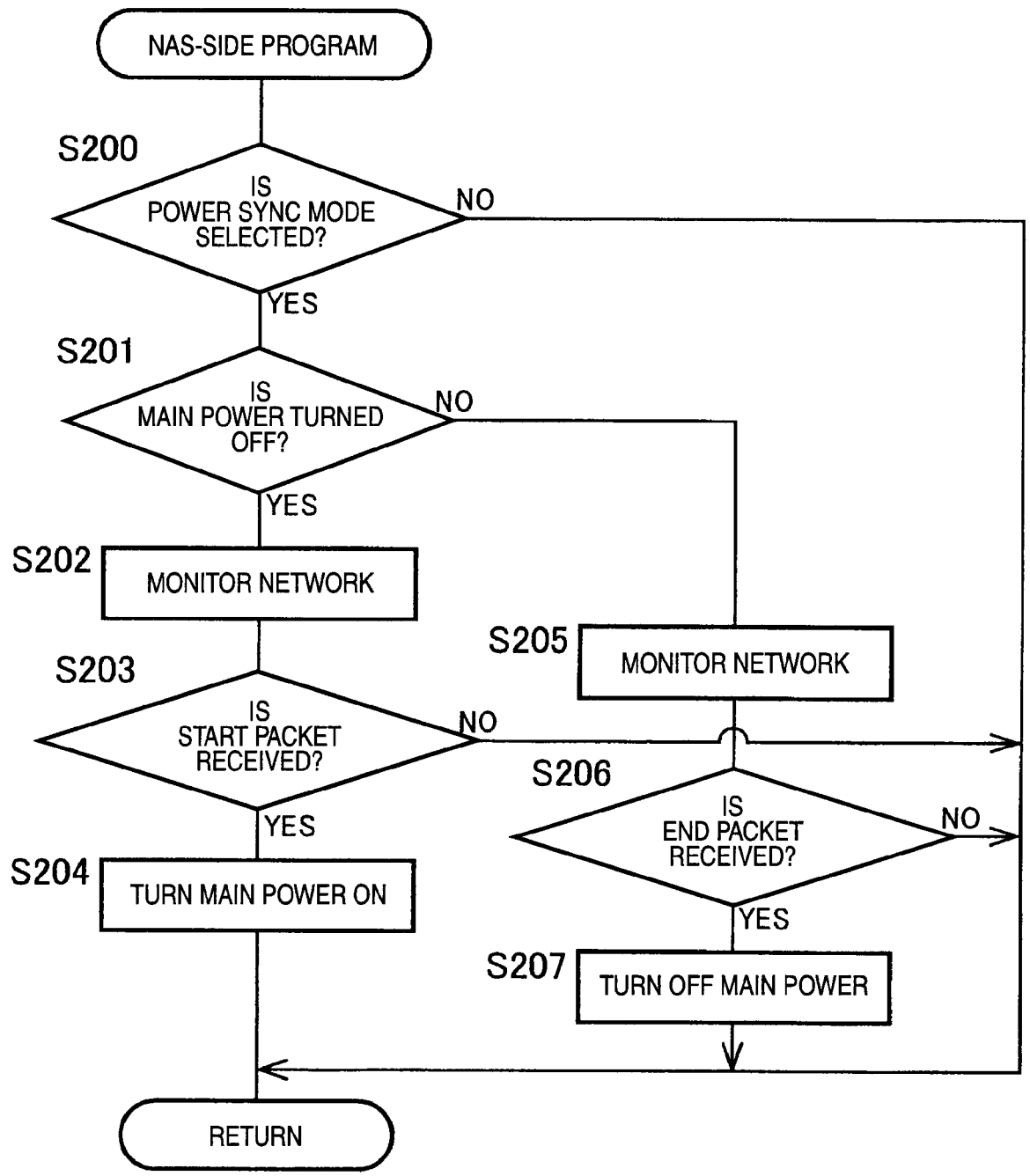
FIG. 6 is a flowchart schematically showing a NAS-side program executed in each of the PCs shown in FIG. 1.

FIG. 6 is a flowchart showing operations based on a NAS-side program executed by the CPU 70 of the NAS 20. In order to implement the specifics of the PC-side program in the NAS 20, the NAS 20 executes the NAS-side program.

In the present embodiment, there is the power sync mode for allowing synchronized power management for turning on or off the main power 62 in synchronism with a change in the operating states of the respective PCs 12 while the power switch 64 remains in an ON state. The power sync mode is not held effective all the times but is selectively made effective in response to the user's operation.

For this reason, in the present embodiment, the NAS 20 is provided, as shown in FIG. 3, with a physical mode changeover switch 90 that is operated by the user to make the power sync mode selectively effective.

In the present embodiment, the mode changeover switch 90 is switched by the user between a position where the power sync mode is made effective and a position where the power sync mode is made ineffective. As shown in FIG. 4, the mode sync switch 90 is mounted on the back of the NAS 20 and configured as; for instance, a slide switch. The physical switch may be provided outside and connected to the NAS 20. Further, a logical switch operable on the PC 12 may be provided, and the mode may be selected in accordance with the input through the logical switch. The logical switch may be provided on an device other than the PC 12 connected to the network 14. For example, the logical switch may be provided at a device directly connected to the NAS 20, e.g., the TV set 22.

In the present embodiment, the state where the power sync mode is effective corresponds to an example of a state where the "first (power sync) mode" in section (1) is selected, whilst the state where the power sync mode is ineffective corresponds to an example of a state where the "second (non-power sync) mode" in section (1) is selected.

As mentioned above, in the present embodiment, the mode changeover switch 90 is a physical switch that is operated by the user to switch the power management mode between an automatic mode (a power sync mode) for automatically turning on or off the power of the NAS 20 and a manual mode (a non-power-sync mode) for manually turning on or off the power of the NAS 20.

As shown in FIG. 4, a LAN port 92, a USB port 94, and an initialization switch 96 are mounted on the back of the NAS 20.

In the ON state of the power switch 64, the NAS-side program shown in FIG. 6 is repeatedly executed by the CPU 70 regardless of whether the main power 62 is held in an OFF state or an ON state by the power controller 60.

Every time processing pertaining to the NAS-side program is performed, a signal from the mode changeover switch 90 is first monitored in step S200, thereby determining whether or not the user holds the power sync mode effective; namely, whether or not the user selects the power sync mode.

When the user has not selected the power sync mode this time, a determination made in step S200 becomes NO, and single execution of processing pertaining to the NAS-side program ends. In this case, the main power 62 is maintained in an ON state without regard to the operating states of the respective PCs 12. Therefore, for instance, the TV 22 can use the NAS 20 regardless of whether or not the respective PCs 12 are being used, so that user's convenience is enhanced.

In contrast, when the user selects the power sync mode this time, the determination made in step S200 becomes YES, and processing proceeds to step S201.

In step S201, it is determined whether or not the main power 62 is held in an OFF state by the power controller 60. Namely, a determination is made as to whether or not the main power 62 is disconnected from the motor 42, the actuator 46, and the motor 50.

When the main power 62 is held in an OFF state by the power controller 60 this time, a determination made in step S201 becomes YES, and the state of the network 14 is monitored in step S202 by means of unillustrated MAC (Media Access Control). Specifically, the NAS 20 monitors the state of the network 14 in the background this time.

Subsequently, in step S203, it is determined whether or not a start packet is received from any one of the PCs 12; namely, a determination is made as to whether or not a start packet is received from the PC 12, whose power has been first turned on, among the four PCs 12.

On the assumption that the start packet is received this time, a determination made in step S203 becomes YES, and the power controller 60 switches the main power 62 to an ON state in step S204. As a consequence, rotation of the hard disk drive 40 and rotation of the cooling fan 48 are resumed.

In addition, the NAS 20 performs processing for switching the main power 62 to an ON state by means of the power controller 60 only when a start packet is received from a certain PC 12 in the OFF state of the main power 62. When a start packet is received from another PC 12 in an ON state of the main power 62, the start packet is unnecessary and hence disregarded.

When execution of processing pertaining to step S204 is completed, single execution of processing pertaining to the NAS-side program ends.

In contrast, when a start packet is not yet received from any of the PCs 12 this time, the determination made in step S203 becomes NO. After skipping of processing pertaining to step S204, single execution of processing pertaining to the NAS-side program ends.

The above explanations are provided to the case where the main power 62 is held in an OFF state by the power controller 60. However, when the main power 62 is held in an ON state by the power controller 60, the determination made in step S201 becomes NO, and the state of the network 14 is monitored in step S205.

Subsequently, in step S206, it is determined which one of the PCs 12 is the source of a received end packet; namely, a determination is made as to whether or not the end packet is received from the PC 12, which has been finally shut down, among the four PCs 12.

When the end packet is received this time, a determination made in step S206 becomes YES, and the power controller 60 switches the main power 62 to an OFF state in step S207. Consequently, rotation of the hard disk drive 40 and rotation of the cooling fan 48 are stopped.

After completion of execution of processing of step S207, single execution of processing pertaining to the NAS-side program ends.

In contrast, when an end packet is not yet received from any of the PCs 12 this time, the determination made in step S206 becomes NO. After skipping of processing pertaining to step S207, single execution of processing pertaining to the NAS-side program ends.

In addition, in the present embodiment, the NAS-side program is repeatedly executed in terms of time. However, the present embodiment may also be changed in such a way that, when the NAS 20 receives a start packet or an end packet, the NAS-side program is activated and executed in accordance with specifics complying with the type of the received packet.

As is evident from the foregoing descriptions, for convenience of explanation, in the present embodiment one NAS 20 can be conceived to serve as an example "network-connectable device" of section (1), and the four PCs 12 can be conceived to serve as the "plurality of computer-related devices" in the section.

In the present embodiment, for convenience of explanation, a portion of the NAS 20 that executes steps S201 through S207 in FIG. 6 can be conceived to serve as an example of "power state switching unit" in section (1); a portion of the NAS 20 that executes processing pertaining to step S200 in the drawing can be conceived to serve as an example of "power state maintenance unit" in the section; and the mode changeover switch 90 can be conceived to serve as an example of "mode selector" in the section.

In the present embodiment, for convenience of explanation, portions of the respective PCs 12 that execute processing pertaining to steps S103 through S107 in FIG. 5 can be conceived to serve as an example of "stop command signal transmission unit" in section (2); the end packet can be conceived to serve as an example of "stop command signal"; portions of the respective PCs 12 that execute processing pertaining to steps S101 and S102 in the drawing can be conceived to serve as an example of "start command signal transmission unit"; and the start packet in the section can be conceived to serve as an example of "start command signal."

In the present embodiment, for convenience of explanation, the mode changeover switch 90 can be conceived to serve as an example of "physical switch" in section (4).

In the present embodiment, for convenience of explanation, the PC-side program shown in FIG. 5 can be conceived to serve as an example of "program" of section (9); and any of the ROM 32, the RAM 34, the hard disk drive 36, and an unillustrated external recording medium (e.g., a CD-ROM where the PC-side program is previously recorded) that records the PC-side program can be conceived to serve as an example of "recording medium" in section (11).

In the present embodiment, for convenience of explanation, the NAS-side program shown in FIG. 6 can be conceived to serve as an example of "program" in section (10); and any of the ROM 72, the RAM 73, and an unillustrated external recording medium (e.g., a CD-ROM where the NAS-side program is previously recorded) that records the NAS-side program can be conceived to serve as an example of "recording medium" in section (11).

A second embodiment of the present invention will now be described. The present embodiment provides detailed explanations about only elements that differ from those described in connection with the first embodiment. Common elements are cited by use of the same reference symbols or designations, thereby omitting their overlapping explanations.

In the first embodiment, each of the PCs 12 monitors the operating states of all of the other PCs 12. When it is detected that all of the PCs 12 are shut down, an end packet is sent to the NAS 20. In contrast, in the present embodiment, the NAS 20 monitors the operating states of all of the PCs 12. When detecting that all of the PCs 12 are shut down, the NAS 20 turns off the main power 62.

Specifically, in the present embodiment, when the NAS 20 received a start packet for commanding activation of the NAS 20 from any of the PCs 12, the PC 12 is registered in a list that is schematically shown in FIGS. 9A to 9E. In the meantime, when the NAS 20 received an end packet for commanding termination of the NAS 20 from any of the PCs 12, the PC 12 is deleted from the list.

Moreover, in the present embodiment, the main power 62 of the NAS 20 is shut down in response to transition of the NAS to a state where none of the PCs 12 are registered in the list. In the meantime, when the first PC 12 is registered in the list, the main power 62 of the NAS 20 is turned on.

Figure 7:
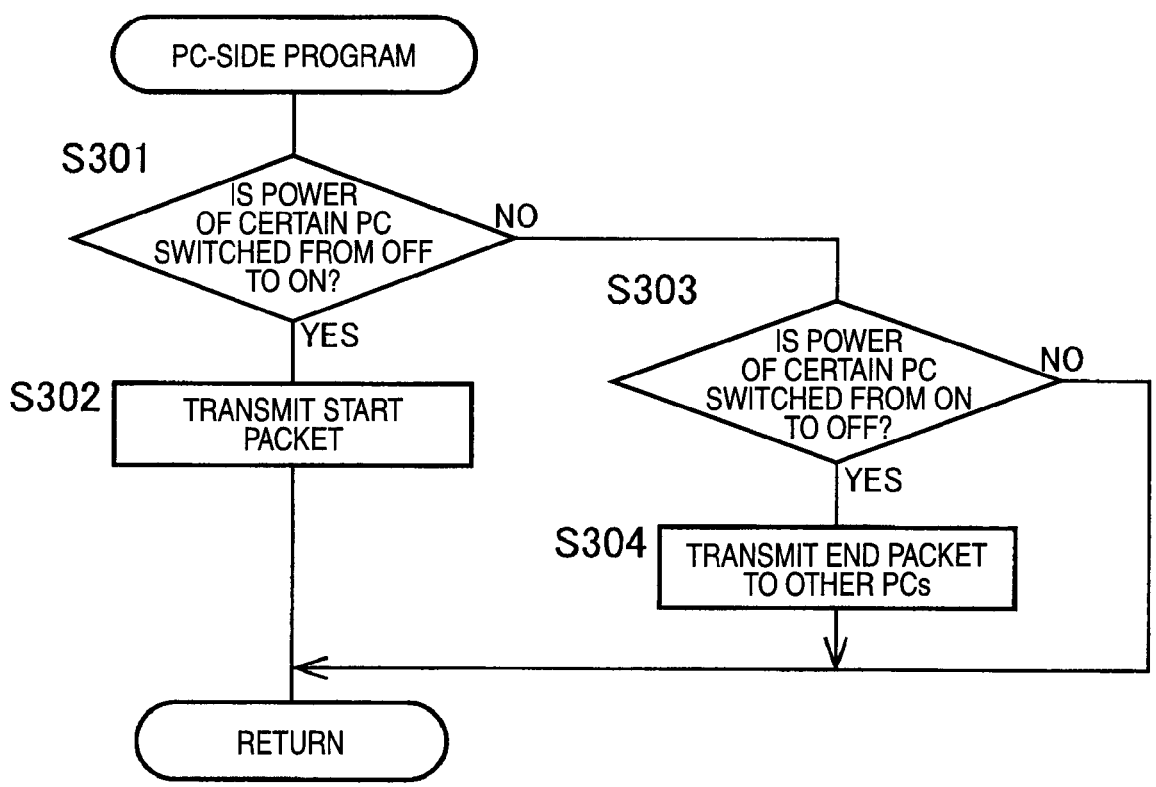
FIG. 7 is a flowchart schematically showing a PC-side program executed in the respective four PCs sharing the NAS as a network-connectable device complying with a second embodiment of the present invention.

In the present embodiment, in order to perform foregoing power management, the PC-side program schematically rendered in a flowchart in FIG. 7 is adopted in lieu of the PC-side program shown in FIG. 5. The PC-side program shown in FIG. 7 will be described hereunder; however, overlapping explanations about the elements common to the PC-side program shown in FIG. 5 are omitted.

When the PC-side program shown in FIG. 7 is launched, it is determined in step S301 whether or not the power of the certain PC 12 is switched from an OFF state to an ON state; namely, whether or not the user has performed power-on operation.

When the power of the certain PC 12 is switched from an OFF state to an ON state this time, the determination made in step S301 becomes YES, and the start packet is transmitted in step S302 from the certain PC 12 to the NAS 20 in association with the PC 12. For example, the PC 12 may transmit the start packet in association with device identification information such as an network address assigned to the PC 12, the device name of the PC 12, or the model number of the PC 12. After performance of processing pertaining to step S302 is completed, single execution of processing pertaining to the PC-side program ends.

In contrast, when the power of the certain PC 12 is not yet switched from an OFF state to an ON state this time, the determination made in step S301 becomes NO. It is determined in step S303 whether or not operation for switching the power of the certain PC 12 from an ON state to an OFF state has been performed; namely, whether or not the user has performed shutdown operation.

On the assumption that the operation for switching the power of the certain PC 12 from an ON state to an OFF state has been performed this time, the determination made in step S303 becomes YES. In step S304, an end packet is transmitted from the certain PC 12 toward the NAS 20 in association with the PC 12. After performance of processing pertaining to step S304 is completed, single execution of processing pertaining to the PC-side program ends.

In contrast, provided that the operation for switching the power of the certain PC 12 from an ON state to an OFF state is not yet performed this time, the determination made in step S303 becomes NO, and processing pertaining to step S304 is skipped. Thus, single execution of processing pertaining to the PC-side program ends.

Figure 8:
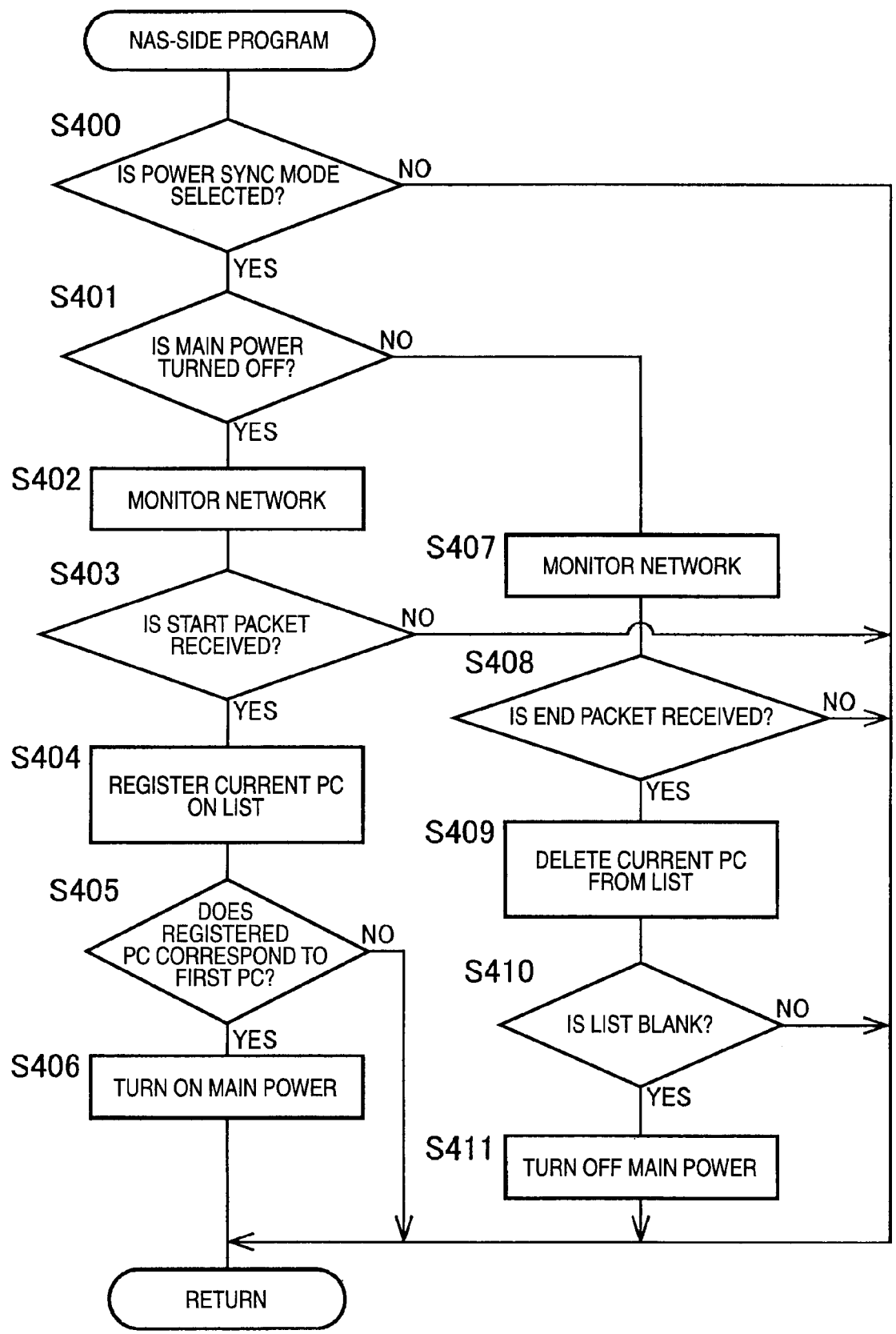
FIG. 8 is a flowchart schematically showing the NAS-side program executed in a NAS complying with the second embodiment.

In the present embodiment, in order to perform the above power management, a NAS-side program schematically shown in the form of a flowchart in FIG. 8 is adopted in place of the NAS-side program shown in FIG. 6. Although the NAS-side program shown in FIG. 8 is described below, overlapping explanations about the elements common to the NAS-side program shown in FIG. 6 are omitted.

In the ON-state of the power switch 64, the NAS-side program shown in FIG. 8 is repeatedly performed by the CPU 70 without regard to whether the main power 62 is held in an OFF state or an ON state by the power controller 60.

Every time the NAS-side program is executed, it is determined in step S400 whether or not the user keeps the power sync mode effective; namely, whether or not the power sync mode is selected, by means of monitoring a signal from the mode changeover switch 90.

Given that the power sync mode is not selected by the user this time, the determination made in step S400 becomes NO, and single execution of processing pertaining to the NAS-side program ends. In this case, the main power 62 is maintained in an ON state regardless of the operating states of the respective PCs 12.

On the assumption that the user has selected the power sync mode this time, the determination made in step S400 becomes YES, and processing proceeds to step S401.

In step S401, it is determined whether or not the main power 62 is held in an OFF state by the power controller 60, as in step S201 shown in FIG. 6.

When the main power 62 is held in an OFF state by the power controller 60 this time, a determination made in step S401 becomes YES. In step S402, the state of the network 14 is monitored as in step S202 shown in FIG. 6.

Subsequently, in step S403, it is determined which one of the PCs 12 is the source of a received start packet. Even in the present embodiment, the start packet is generated by each PC 12 independently of the other PCs 12, as in the first embodiment. Hence, every time power of the respective PCs 12 is turned on, the respective PCs 12 transmit start packets to the NAS 20.

When a start packet is received this time, the determination made in step S403 becomes YES. In step S404, the PC 12, which has transmitted the start packet received this time, among the four PCs 12 is registered in a list schematically shown in FIGS. 9A to 9E (the list can be stored, for example, on the RAM 73).

Figure 9:
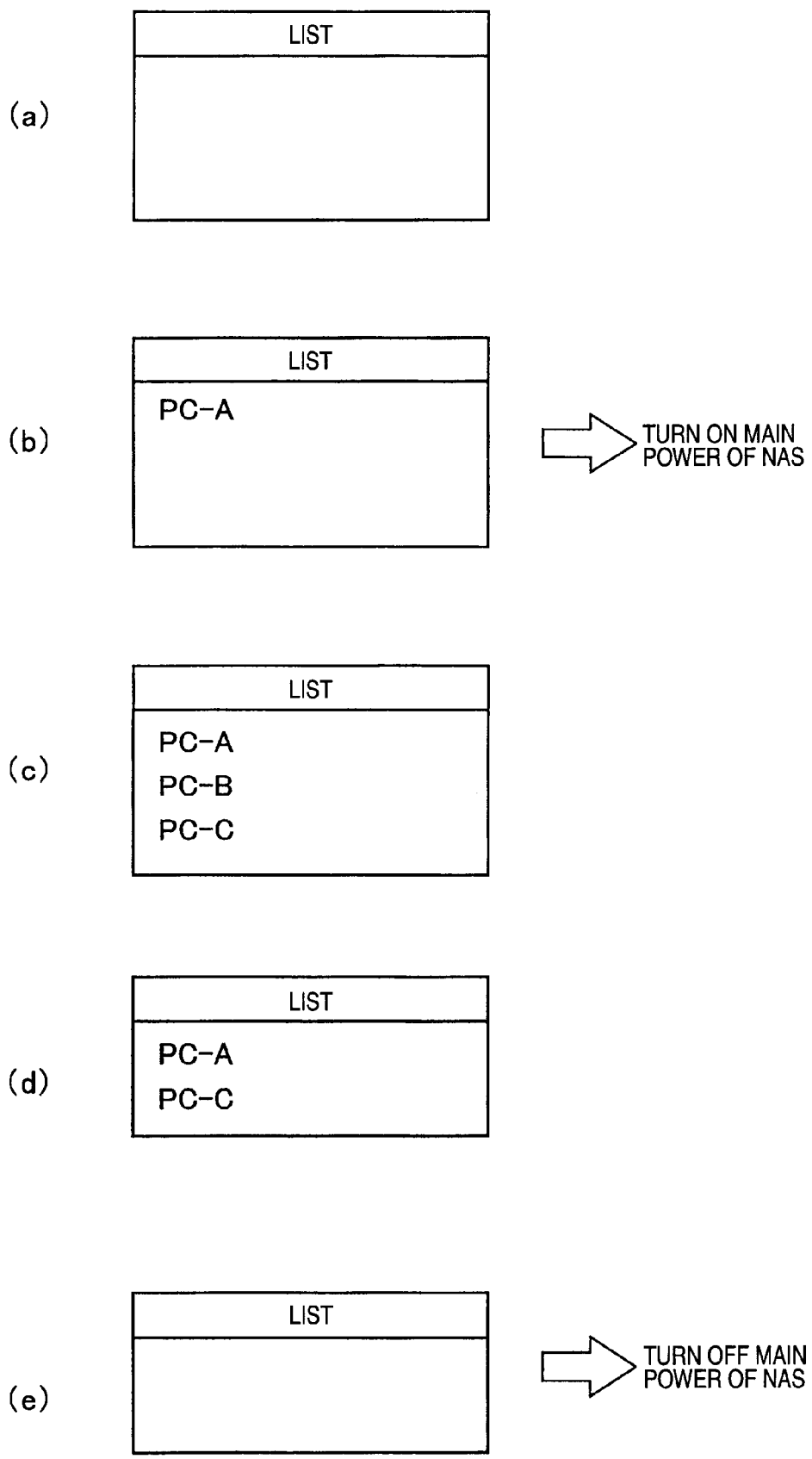
FIGS. 9A to 9E are views schematically showing a list to which a reference is made for executing processing pertaining to the NAS-side program shown in FIG. 8, along with an example of transition in state.

FIG. 9A shows a list where none of the PCs 12 are registered, and FIG. 9B shows a list where PC-A is first registered. FIG. 9C shows a list where PC-B and PC-C are additionally registered because the PC-B and PC-C are powered up subsequently to PC-A as a result of the NAS-side program being executed a plurality of times.

Subsequently, in step S405, it is determined whether or not the PC 12 registered in the list as a result of the process in step S404 being executed this time is the first PC 12 among the four PCs 12; namely, a determination is made as to whether or not the PC 12 is the PC 12 first registered in a blank list.

For instance, as shown in FIG. 9B, when PC-A is first registered in the list, a determination made in step S405 becomes YES. In contrast, as shown in FIG. 9C, when PC-C is additionally registered in the list where PC-A and PC-B are already registered, the determination made in step S405 becomes NO for PC-C.

When the determination made in step S405 is YES this time, the main power 62 is switched, in step S406, to an ON state by the power controller 60 as in step S204 shown in FIG. 6. As a consequence, rotation of the hard disk drive 40 and rotation of the cooling fan 48 are resumed. After completion of performance of processing to step S406, single performance of processing pertaining to the NAS-side program ends.

In contrast, given that the determination made in step S405 is NO this time, single execution of processing pertaining to the NAS-side program ends after skipping of processing pertaining to step S406.

In the above, descriptions have been given to the case where the main power 62 is held in an OFF state by the power controller 60. However, when the main power 62 is held in an ON state by the power controller 60, the determination made in step S401 becomes NO, and the state of the network 14 is monitored in step S407 as in step S205 shown in FIG. 6.

Subsequently, in step S408, it is determined which one of the PCs 12 is the source of a received end packet. In the present embodiment, each PC 12 generates an end packet independently of the other PCs 12 as distinct from the first embodiment. Hence, every time the respective PCs 12 are shut down, the respective PCs 12 transmit end packets to the NAS 20.

When the end packet is received this time, a determination made in step S408 becomes YES, and the PC 12 transmitted the end packet this time is deleted from the list in step S409. In the embodiment shown in FIGS. 9A to 9E, when, for example, PC-B, transmits the end packet, PC-B is deleted from the list. As a consequence, specifics of the list are altered from those shown in FIG. 9C to those shown in FIG. 9D.

Subsequently, in step S410, it is determined whether or not the list is blank. For instance, in the embodiment shown in FIGS. 9A to 9E, specifics of the list are altered from those shown in FIG. 9D to those shown in FIG. 9E as a result of deletion of PC-A and PC-C, and the determination made in step S410 becomes YES.

When the determination made in step S410 is YES this time, the main power 62 is switched, in step S411, to an OFF state by the power controller 60 as in step S207 shown in FIG. 6. As a consequence, rotation of the hard disk drive 40 and rotation of the cooling fan 48 are halted. After completion of performance of processing pertaining to step S411, single execution of processing pertaining to the NAS-side program ends.

In contrast, when the determination made in step S410 is NO this time, single execution of processing pertaining to the NAS-side program ends after skipping of processing pertaining to step S411.

As is evident from the foregoing explanations, in the present embodiment, for convenience of explanation, a portion of the NAS 20 that executes processing pertaining to steps S401 through S411 in FIG. 8 can be conceived to serve as an example of "power state switching unit" in section (1); a portion of the NAS 20 that executes processing pertaining to step S400 in the drawing can be conceived to serve as an example of "power state maintenance unit" in the section; and the mode changeover switch 90 can be conceived to serve as an example of "mode selector" in the section.

Further, in the present embodiment, for convenience of explanation, a portion of the NAS 20 that performs processing in steps S402 to S404 and processing in steps S407 to S409 shown in FIG. 7 can be conceived to serve as an example of "list management unit" in section (3); the start packet can be conceived to serve as an example of "start command signal" in the section; a portion of the NAS 20 that performs processing pertaining to steps S401 and S411 in the drawing can be conceived to serve as an example of "shutdown unit" in the section; and a portion of the NAS 20 that performs processing pertaining to steps S405 and S406 in the drawing can be conceived to serve as an example of "power-on unit" in the section.

Moreover, in the present embodiment, for convenience of explanation, the mode changeover switch 90 can be conceived to serve as an example of "physical switch" in section (4).

In the present embodiment, for convenience of explanation, the PC-side program shown in FIG. 7 can be conceived to serve as an example of "program" of section (9); and any of the ROM 32, the RAM 34, the hard disk drive 36, and an unillustrated external recording medium (e.g., a CD-ROM where the PC-side program is previously recorded) that records the PC-side program can be conceived to serve as an example of "recording medium" in section (11).

In the present embodiment, for convenience of explanation, the NAS-side program shown in FIG. 8 can be conceived to serve as an example of "program" in section (10); and any of the ROM 72, the RAM 73, and an unillustrated external recording medium (e.g., a CD-ROM where the NAS-side program is previously recorded) that records the NAS-side program can be conceived to serve as an example of "recording medium" in section (11).

In some of the above-described embodiments, the NAS is selected as a network-connectable device. However, the present invention can be implemented by selection of another storage device (e.g., memory of a type not having a movable section for data storage purpose), another network-related device (e.g., a router, and the like), home electrical appliances (e.g., a media player, a TV set, a refrigerator, and the like), or office device (e.g., a printer, a copier, and the like), in place of or in addition to the NAS.

Moreover, in some of the above-described embodiments, a PC is selected as computer-related device. However, the present invention can be implemented by selection of home electrical appliances (e.g., a reproducing device configured to reproduce an image or a sound such as a media player or a TV set, a refrigerator, and the like) or office device (e.g., a printer, a copier, and the like) in place of or in addition to the PC.

In the above embodiments, the power on/off of the NAS 20 (i.e., the network-connectable device) is switched in response to the power-on operation and shutdown operation of the PCs 12 (i.e., the computer-related device). However, the present invention is not limited thereto.

For example, the NAS 20 may include a power state switching unit operable on the first power (power sync) mode and a power state maintaining unit operable on the second power (non-power-sync) mode. The power state switching unit is configured to: turn on power of the NAS 20 when one of the computer-related devices is connected to the network 14 in a state where no PC 12 has been connected to the network 14; and shut down the power when no PC 12 is connected to the network 14. The power state maintaining unit is configured to maintain the power of the NAS 20 in a same state regardless of whether the PCs 12 are connected to or disconnected from the network 14.

Further, each of the PC 12 may include a stop command signal transmission unit and a start command signal transmission unit. The stop command signal transmission unit is configured to: determine, in response to disconnection operation of the PC 12 for a disconnection from the network 14, whether other PCs 12 are already disconnected from the network 14; and transmit a stop command signal to the NAS 20 via the network 14 when all the other PCs 12 are determined to be already disconnected from the network. The start command signal transmission unit is configured to transmit a start command signal to the NAS 20 via the network 14 in response to connection operation of the PC 12 for a connection with the network 14. In this case, the power state switching unit may be configured to: shut down the power of the NAS 20 when the NAS 20 receives the stop command signal; and turn on the power of the NAS 20 when the NAS 20 receives the start command signal.

Alternatively, the power state switching unit of the NAS 20 may include a list management unit and a shutdown unit. The list management unit is configured to: when the list management receives a start command signal instructing an activation of the NAS 20 which is transmitted from a PC 12, register the PC 12 on a list; and when the PC 12 registered on the list is switched to or is to be switched to a disconnected state disconnected from the network 14, delete the PC 12 from the list. The shutdown unit is configured to shut down power to a part of the NAS 20 when none of the PC 12 is registered on the list.

In the above embodiment, FIG. 1 shows the network system 10 with a single network 14. However, a plurality of networks may be provided in a same network.

Figure 10:
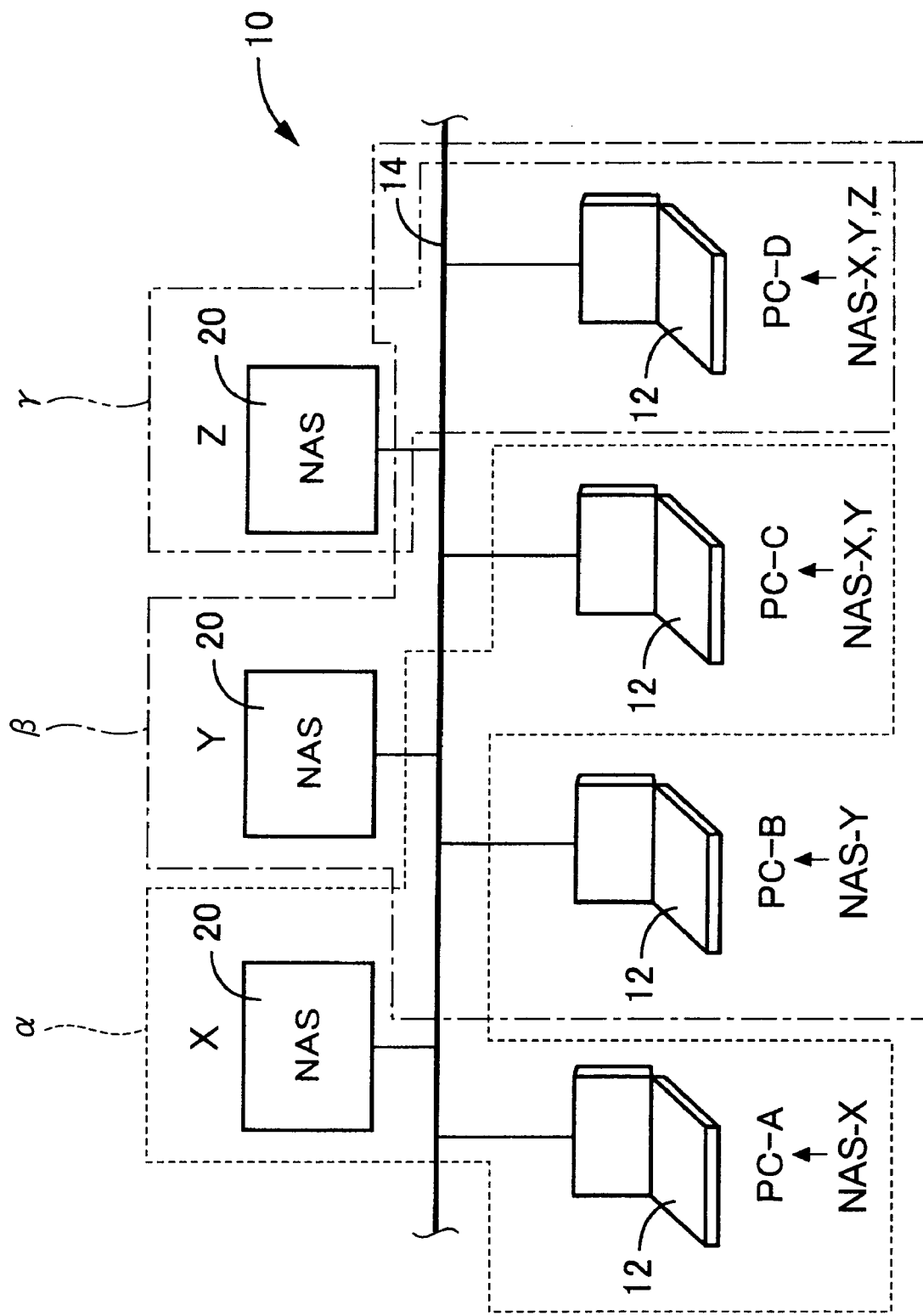
FIG. 10 is a schematic diagram showing another network system using the NAS.

As shown in FIG. 10, the network system 10B includes PCs 12 (PC-A, PC-B, PC-C and PC-D) and NASs 20 (NAS-X, NAS-Y and NAS-Z). In this regard, PC-A, PC-B, PC-C, PC-D, NAS-X, NAS-Y and NAS-Z are connected to the (same) network 14. Incidentally, for each of the PC-A, PC-B, PC-C and PC-D, the connectable NAS (s) 20 may be set. In the example shown in FIG. 10, the PC-A is set to be connectable to the NAS-X, the PC-B is set to be connectable to the NAS-Y, the PC-C is set to be connectable to NAS-X and NAS-Y, and the PC-D is set to be connectable to NAS-X, NAS-Y and NAS-Z. In other words, the NAS-X, NAS-Y and NAS-Z may be shared by different PC groups, respectively.

In this case, although the network system 10B may be interpreted as including a single network 14, but the network system 10B may be interpreted as including three networks respectively corresponding to the NASs 20, that is, a network α including the NAS-X and the PC-A, PC-C and PC-D, a network β including the NAS-Y and the PC-B, PC-C and PC-D, and a network γ including the NAS-Z and the PC-D.

In case where the system of the embodiments is applied to this network system 10B, for example, when the PC-B is connected to the network β (or the PC-B is connected to the network 14, or the PC-B is activated), the NAS-Y on the first power mode (power sync mode) is powered on. When no PCs 12 is connected to the network β (or no PC is connected to the network 14, or no PC is activated), the NAS-Y on the first mode (power sync mode) is powered off.

In addition, in case where the system of the embodiments in which the PC 12 transmits the stop command is applied to this network system 10B, for example, when the PC-C is to be disconnected from the network β, the PC-C determines whether the PC-B and PC-D belonging to the target network (i.e., the network β) has been disconnected from the network β (or disconnected from the network 14 or deactivated). When all the other PCs 12 (PC-B and PC-D) belonging to the target networks (the network β) are already disconnected from the network β, the PC 12 transmits the stop command signal to the NAS-Y belonging to the network β. On the other hand, when the PC-C is to be disconnected from the network 14 or to be shut down, the target network of the disconnection is the networks α, β and γ. Therefore the PC-C determines whether the PC-A, PC-B and PC-D belonging to the target network (i.e., the networks α, β and γ) has been disconnected from the respective networks (or disconnected from the network 14 or deactivated). When the PC-A is connected to the network α, and the PC-B and PC-D is already deactivated, the PC-C does not transmit the stop command signal to the NAS-X since there is other connected PC 12 in the network α (i.e., PC-A) and, but the PC-C transmits the stop command signal to the NAS-Y and NAS-Z respectively belonging to the networks β and γ since all the other PCs 12 in the networks β and γ (PC-B and PC-D) are already disconnected from the network β.

Although some of the embodiments of the present invention have been described in detail by reference to the drawings, the embodiments are illustrative. The present invention can be implemented in other forms, including the modes described in connection with the aspects of the invention, that are contrived by making various alterations or modifications to the present embodiments on the basis of the knowledge of the skilled persons.

What is claimed is:

1. A network-connectable device configured to communicate with one or more computer-related devices via a network, said network-connectable device comprising:
a mode selector configured to select a power mode between a first power mode and a second power mode;
a power state switching unit operable on the first power mode and configured to:
turn on power of the network-connectable device when one of the computer-related devices is connected to the network in a state where no computer-related device has been connected to the network; and
shut down the power when no computer-related device is connected to the network;
a power state maintaining unit operable on the second power mode and configured to maintain the power of the network connectable device in a same state regardless of whether the computer-related devices are connected to or disconnected from the network,
wherein each of the computer-related devices comprises:
a stop command signal transmission unit configured to:
determine, in response to disconnection operation of the computer-related device for a disconnection from the network, whether other computer-related devices are already disconnected from the network; and transmit a stop command signal to the network-connectable device via the network when all the other computer-related devices are determined to be already disconnected from the network; and a start command signal transmission unit configured to transmit a start command signal to the network-connectable device via the network in response to connection operation of the computer-related device for a connection with the network, and wherein the power state switching unit is configured to:
shut down the power of the network-connectable device when the network-connectable device receives the stop command signal; and
turn on the power of the network-connectable device when the network-connectable device receives the start command signal.

2. A network-connectable device configured to communicate with one or more computer-related devices via a network, said network-connectable device comprising:
a mode selector configured to select a power mode between a first power mode and a second power mode;
a power state switching unit operable on the first power mode and configured to:
turn on power of the network-connectable device when one of the computer-related devices is connected to the network in a state where no computer-related device has been connected to the network; and
shut down the power when no computer-related device is connected to the network;
a power state maintaining unit operable on the second power mode and configured to maintain the power of the network connectable device in a same state regardless of whether the computer-related devices are connected to or disconnected from the network,
wherein the power state switching unit comprises:
a list management unit configured to:
when the list management receives a start command signal instructing an activation of the network-connectable device which is transmitted from a computer-related device, register the computer-related device on a list; and
when the computer-related device registered on the list is switched to or is to be switched to a disconnected state disconnected from the network, delete the computer-related device from the list; and
a shutdown unit configured to shut down power to a part of the network-connectable device when none of the computer-related devices is registered on the list; and
a power-on unit configured to turn on the power when a computer-related device is registered on the list on which no computer-related device has been registered.

3. The network-connectable device according to claim 2, wherein the power state switching unit is configured to:
turn on the power in synchronism with powered-on operation of the one of the computer-related device; and
shut off the power in synchronism with shutdown operations of all of the computer related devices.

4. The network-connectable device according to claim 2, further comprising a motor as a drive source, wherein the power state switching unit is configured to switch power to the motor.

5. The network-connectable device according to claim 2, further comprising a reproducing device configured to reproduce an image or a sound, wherein the power state switching unit is configured to switch power to the reproducing device.

6. The network-connectable device according to claim 2, wherein the computer-related devices comprise at least one of a desktop computer, a portable computer and a digital home electrical appliance.

7. The network-connectable device according to claim 4, further comprising a storage device that comprises a data-recordable hard disk driven by the motor.

8. A network-connectable device configured to communicate with one or more computer-related devices via a network, said network-connectable device comprising:
a mode selector configured to select a power mode between a first power mode and a second power mode;
a power state switching unit operable on the first power mode and configured to:
turn on power of the network-connectable device when one of the computer-related devices is connected to the network in a state where no computer-related device has been connected to the network; and
shut down the power when no computer-related device is connected to the network;
a power state maintaining unit operable on the second power mode and configured to maintain the power of the network connectable device in a same state regardless of whether the computer-related devices are connected to or disconnected from the network,
wherein the mode selector comprises a physical switch to be operated by the user and selects either the first mode and the second mode in accordance with an operating state of the switch.

9. A network-connectable device configured to communicate with one or more computer-related devices via a network, said network-connectable device, comprising:
a mode selector configured to select a power mode between a first power mode and a second power mode;
a power state switching unit operable on the first power mode and configured to:
turn on power of the network-connectable device when one of the computer-related devices is connected to the network in a state where no computer-related device has been connected to the network; and
shut down the power when no computer-related device is connected to the network;
a power state maintaining unit operable on the second power mode and configured to maintain the power of the network connectable device in a same state regardless of whether the computer-related devices are connected to or disconnected from the network;
a first power source;
a second power source;
a first unit operable on power supplied from the first power source; and
a second unit operable on power supplied from the second power source, the second unit comprising the power state switching unit and the power state maintaining unit, wherein the power state switching unit is configured to switch the power from the first power source to the first unit.

10. A method for managing power of a network-connectable device from a computer-related device connected thereto via a network, the network-connectable device comprising:
- a mode selector configured to select a power mode between a first power mode and a second power mode;
- a power state switching unit operable on the first power mode and configured to:
  - shut down the power of the network-connectable device when the network-connectable device receives a stop command signal; and
  - turn on the power of the network-connectable device when the network-connectable device receives a start command signal; and
- a power state maintaining unit operable on the second power mode and configured to maintain the power of the network connectable device in a same state regardless of whether the computer-related devices are connected with or disconnected from the network-connectable device, said method comprising:
- determining, in response to a disconnection operation of a computer-related device for a disconnection from the network, whether other computer-related devices are already shut down;
- transmitting the stop command signal to the network-connectable device via the network when all the other computer-related devices are already shut down as a result of the determination; and
- transmitting the start command signal to the network-connectable device via the network in response to connection operation of the device for a connection with network.

* * * * *